(Model.)
L. BASTET.
COMPOSITION FOR AND PROCESS OF MANUFACTURING JOURNAL BEARINGS
No. 248,274. Patented Oct. 18, 1881.
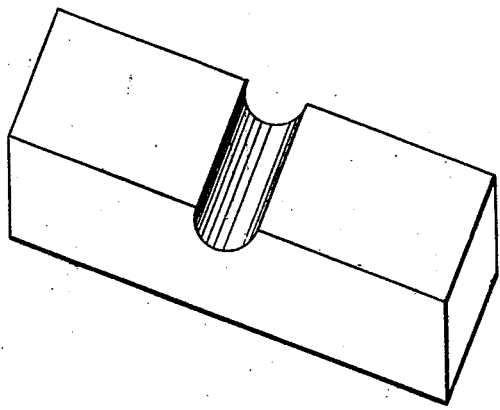
Witnesses:
Inventor.
Louis Bastet,
By A. P. Thayer,
atty

UNITED STATES PATENT OFFICE.

LOUIS BASTET, OF BROOKLYN, NEW YORK.

COMPOSITION FOR AND PROCESS OF MANUFACTURING JOURNAL-BEARINGS.

SPECIFICATION forming part of Letters Patent No. 248,274, dated October 18, 1881.

Application filed January 19, 1881. (Model and specimens.)

*To all whom it may concern:*

Be it known that I, LOUIS BASTET, of Brooklyn, Kings county, and State of New York, have invented a new and useful Improvement in Compositions for and Processes of Manufacturing Journal or Axle Bearings or Boxes, of which the following is a specification.

My invention consists, essentially, of a new article of manufacture, forming an axle or journal box for machinery of all kinds, also for car and carriage or wagon axle-boxes generally; and it also consists of a process of making the same.

The said improved journal and axle boxes consist of plumbago mixed with phosphate of lime and a solution of alkaline silicate of potash or soda, which mixture is molded, while in a plastic state, to produce the form or shape desired for the box or bearing, then baked or dried to harden and solidify the material, and then, when desired, saturated with a mixture of melted tallow and crude paraffine to smooth the lime.

The accompanying drawing represents a perspective view of a half journal-box for shafting of my improvement.

In carrying out my invention I mix ground plumbago and phosphate of lime well together at ordinary atmospheric temperature in any desired proportions, from twenty-five parts of either to one hundred of both, and then mix therewith, also at atmospheric temperature, a solution of alkaline silicate of potash or soda in sufficient quantity to form a thick paste. From this paste I mold or otherwise shape or form the box or bearing to suit the journal or axle to which it is to be applied, and then dry and harden it by heat, either natural or artificial—from 50° to 120° Fahrenheit—to which it is exposed until thoroughly hard and dry.

I prefer to bake the articles in an oven, by which the hardening may be sooner effected, and the heat may be regulated and controlled to better advantage, according to the judgment of the operator.

The boxes may be used in this condition; but to smooth and render the lime less harsh, and thus make them more serviceable and durable, I saturate them, when so dried and solidified, with a mixture of melted tallow and crude paraffine of about 220° Fahrenheit, in which I immerse them for about half an hour, but varying somewhat, according to the size of the article.

The proportions of the mixture of tallow and paraffine may be from twenty-five to seventy-five of either to one hundred of both.

What I claim, and desire to secure by Letters Patent, is—

1. The herein-described improved article of manufacture, consisting of a journal or axle box composed of a solidified mixture of plumbago, phosphate of lime, and alkaline silicate of potash or soda, substantially as specified.

2. The herein-described improved article of manufacture, consisting of a journal or axle box composed of a solidified mixture of plumbago, phosphate of lime, and alkaline silicate of potash or soda, saturated with a mixture of melted tallow and paraffine, substantially as specified.

3. The process of manufacture of axle or journal boxes, consisting of, first, mixing plumbago and phosphate of lime; second, adding thereto a solution of alkaline silicate of potash or soda, and thereby forming a paste; third, molding or otherwise forming or shaping the boxes or bearings from said paste; and, fourth, drying or baking and hardening the same by heat, substantially as specified.

4. The process of manufacture of axle or journal boxes, consisting of, first, mixing plumbago and phosphate of lime; second, adding thereto a solution of alkaline silicate of potash or soda, and forming a paste therewith; third, molding or otherwise shaping or forming the boxes from said paste; fourth, drying or baking and hardening the same with heat; and, fifth, saturating the said boxes or bearings with a mixture of melted tallow and crude paraffine, substantially as set forth.

LOUIS BASTET.

Witnesses:
A. P. THAYER,
W. J. MORGAN.